(12) United States Patent
Lefort

(10) Patent No.: US 6,349,040 B2
(45) Date of Patent: *Feb. 19, 2002

(54) ELECTRONIC DEVICE WITH A VARIABLE KEYBOARD

(75) Inventor: Loïc Lefort, Le Mans (FR)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/259,956

(22) Filed: Mar. 1, 1999

(30) Foreign Application Priority Data

Mar. 3, 1998 (FR) .............................. 98 02544

(51) Int. Cl.⁷ .............................. H05K 5/00; H04B 1/38
(52) U.S. Cl. ........................ 361/814; 361/679; 455/90; 379/433; D14/138
(58) Field of Search ................................ 361/752, 814, 361/679–680; 455/90; 379/433; D14/137, 138

(56) References Cited

U.S. PATENT DOCUMENTS 5,363,089 A   11/1994   Goldenberg ................ 340/825
5,657,370 A * 8/1997   Tsugane et al. ............. 455/550
5,661,641 A   8/1997   Shindo ........................ 361/814
5,936,583 A * 8/1999   Sekine et al. ............... 343/702
6,009,338 A * 12/1999  Iwata et al. ................. 455/575

FOREIGN PATENT DOCUMENTS

EP   0472361 A2   2/1992   ............ H04M/1/72
EP   0661824 A1   7/1995   ............ H04B/1/38

OTHER PUBLICATIONS

By IBM Techical Disclosure Bulletin "Personal Communicator Configurations", Jun. 1, 1994, vol. 37, No. 6A PP. 450, Line 23, p. 451, Line 8, Figures 3A, 3B.

* cited by examiner

Primary Examiner—Jayprakash N. Gandhi
(74) Attorney, Agent, or Firm—Dicran Halajian

(57) ABSTRACT

An electronic device includes a display and a keyboard having a fixed part and a movable part. The movable part moves between an open position and a closed position. The size of the electronic device remains unchanged when the movable part is in the open and closed positions. The movable part covers a portion of the display in the open position, and has back keys which cover the display portion and are inaccessible by the user. In the closed position, the entire display is exposed, and front keys of the movable part are inaccessible and cover keys of the fixed part.

20 Claims, 2 Drawing Sheets

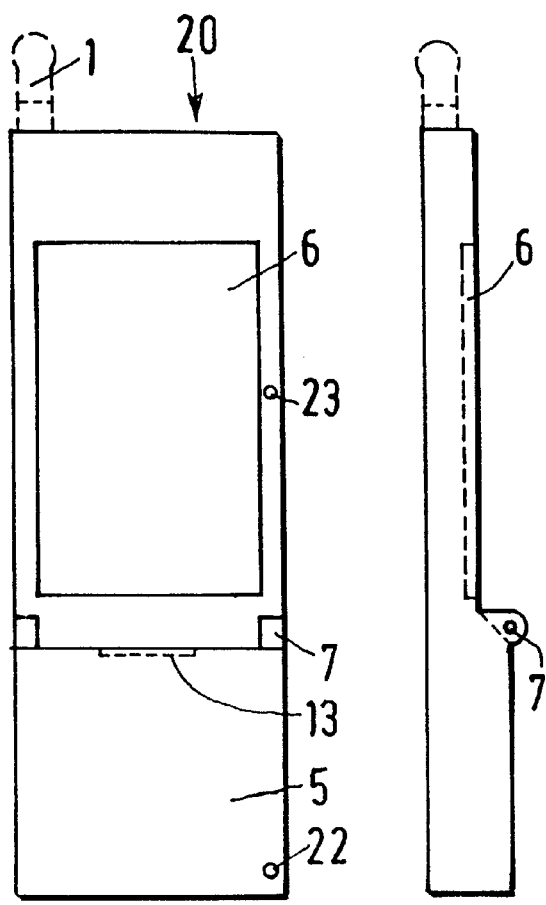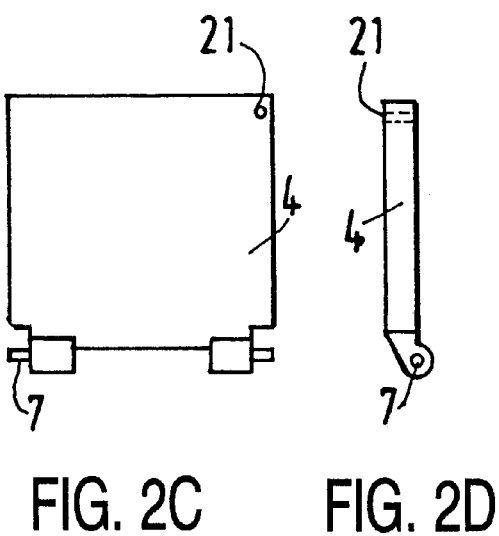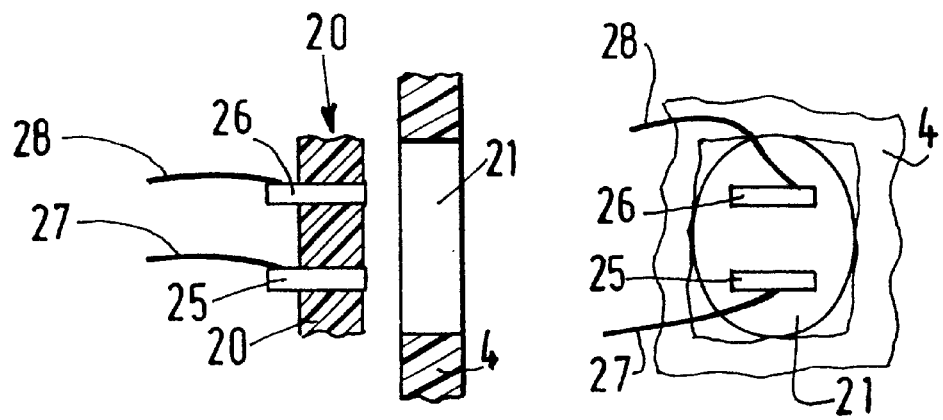
FIG. 2A  FIG. 2B  FIG. 2C  FIG. 2D
FIG. 3A  FIG. 3B

ELECTRONIC DEVICE WITH A VARIABLE KEYBOARD

FIELD OF THE INVENTION

The present invention relates to an electronic device with a main side having user connection means such as a keyboard with keys and a display.

Portable electronic devices can be held in hand such as calculators, pagers, organizers and other calculation or communication devices, such as mobile telephones or cordless telephones. Such devices are ever smaller and lighter and the functions and services they provide increase. It thus becomes possible to combine various devices. However, the size reduction notably of present-day mobile telephones is restricted by several components whose size is not easy to reduce, such as the keyboard or the display. It is possible to use a device with a sliding or tilting keyboard, but in open position the keys on the sliding or tilting part are not easy to handle: only the main part is held in hand and there is no firm support for a pressure on this or that key on the sliding or tilting flap that supports the keys of the keyboard.

BACKGROUND OF THE INVENTION

From European patent EP-A-0 472 361 is notably known a portable workstation comprising a personal computer and a mobile telephone in one and the same construction. This device comprises a pivoting keyboard part that enables to change from a mobile telephone keyboard to a keyboard of a personal computer, which change is accompanied with the change from a small display to a large display. During this movement, however, the size of the device is notably increased and the keys of the mobile telephone keyboard remain accessible, not protected, and may be operated inadvertently.

SUMMARY OF THE INVENTION

According to the invention, the drawbacks of the prior art are diminished or suppressed thanks to the fact that the electronic device indicated in the first paragraph is characterized in that a first part of the keyboard is fixed and that a second part, permanently firmly attached to said device, comprises positioning means so that it is movable between two operational positions for which said device retains an invariable size, a first position in which said keyboard is called reduced and a second position in which said keyboard is called extended, and such that the change from one position to the other renders the keys of the keyboard accessible to said user for the end position and keys of the keyboard inaccessible for the starting position.

In this manner, the change from an electronic device to a device of another configuration but having the same size is complete and exclusive and a correct push on the keys of the keyboard is ensured for both configurations.

Preferably, in the second position, with the keyboard extended, the movable part of the keyboard masks part of said display. Thus, the change from an extended keyboard to a reduced keyboard is accompanied with an enlargement of the display.

A preferred embodiment of the invention is characterized in that said movable part of the keyboard comprises pivoting means for pivoting from one to the other around a hinge located on said main side, between an edge of the display and an edge of the first fixed part of the keyboard, and in that this movable part of the keyboard comprises a key configuration on each of its main sides, and connection means for connecting to electronic elements located inside the housing of the device.

Advantageously, the connection means are formed by a flat cable of conducting wires which run across the main side of the device through a recess made at the level of said hinge. The device according to the invention, realized thus, is well adapted notably for forming a mobile telephone in its first extended-keyboard position and an organizer in its reduced-keyboard position. The combination of a mobile telephone with another device, notably an organizer, is interesting because, for example, the organizer enables to immediately register pieces of information obtained by telephone.

BRIEF DESCRIPTION OF THE DRAWINGS

These and other aspects of the invention are apparent from and will be elucidated with reference to the embodiment(s) described hereinafter, which constitute a non-limitative example.

In the drawings:

FIG. 3 represents in A a side view and in B a front view of the detail of the immobilizing means of the second movable part of the keyboard and of means establishing electrical contact.

DESCRIPTION OF PREFERRED EMBODIMENTS

Figures 1A, 1B, 1C, 1D:
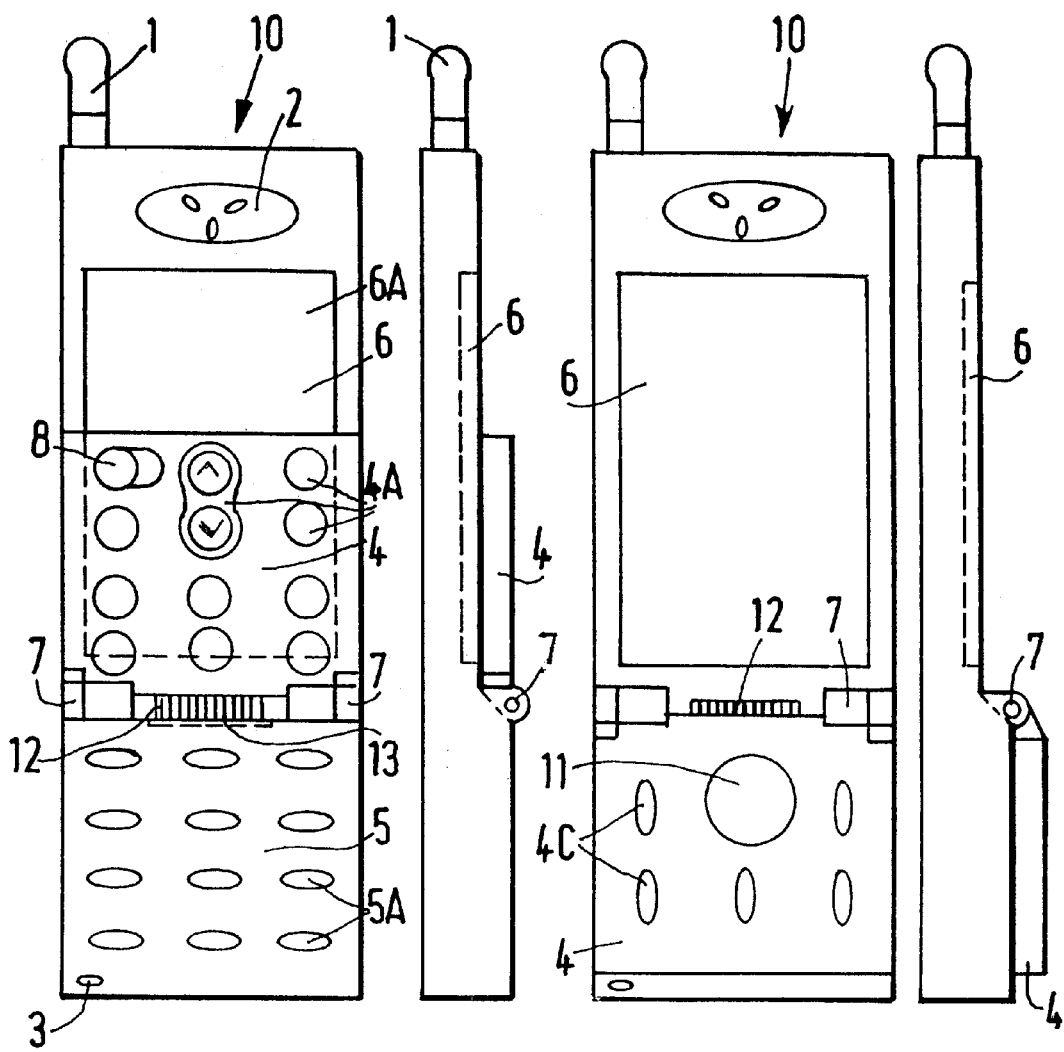
FIG. 1 represents in A a front view and in B a side view of a device according to the invention in its second position; in C a front view and in D a side view, of the same device in its first position, FIG. 2 diagrammatically represents in A a front view and in B a side view of the main fixed part of the device of FIG. 1; in C a front view and in D a side view of the second movable part of the keyboard of the device of FIG. 1.

The device 10 represented in FIGS. 1A and 1B has the appearance and functionalities of a conventional mobile telephone. On a main side, FIG. 1A, it comprises an antenna 1 and means for connection to a user such as an earphone 2, a microphone 3, a keyboard with keys formed in two parts 4 and 5 and a display 6 which is preferably a liquid crystal display called LCD. In known manner, a first part 5 of the keyboard, which is in this case the lower part, is fixed and preferably comprises in the form of keys 5A the part reserved for dialing, that is, the ten digits and the asterisk and square buttons. The second part 4 of the keyboard is movable according to the invention. In the embodiment of FIG. 1 and as represented in the FIGS. 1A and 1B, the part 4 has been handled by pivoting it around a hinge 7 so as to have it occupy a high position called second position, in which it features keys 4A and which enables to obtain a large keyboard called extended keyboard. The parts 4 and 5 of the keyboard are substantially square and of equal size. This is necessary and is linked with the fact that in its first position represented in FIGS. 1C and 1D, the keys 4A and 5A are situated opposite one another and nearly in contact with one another, thus being rendered inaccessible and protected.

For a use as a mobile telephone, the number of keys 4A may be reduced to about 6 which, added to the 12 keys 5A, form a sufficient number. However, it will be noted that the keys 4A could be brought to the number of 12, like for the keys 5A, which enables to transform the device of FIGS. 1A and 1B into a pocket calculator by means of an appropriate supplementary programming of the device and an electric switch-over, for example, by means of a key 8 capable of occupying two lateral positions among the keys 4A to enable the change from mobile to calculator or vice versa, these two perfections being within the scope of a person of ordinary skill in the art. It will be noted that in the FIGS. 1A and 1B the mobile keyboard 4 masks the greater lower part of the display, whose upper part 6A, only visible in these Figures, and only the upper part, is designed for being programmable when the device functions as a mobile or as a calculator. If the miniaturization of the device is much advanced, the number of the keys 5A or 4A is reduced to a maximum of 9 and it becomes difficult if not impossible to transform the device into a calculator in its configuration of the FIGS. 1A and 1B.

In the FIGS. 1C and 1D, the device described above is represented with its second movable part 4 of the keyboard in its first position, that is, in its low position, in which it masks the keys 5A and features keys 4C whose number is equal or substantially equal to that of the keys 4A or 5A. This is a reduced keyboard compared to the keyboard of FIGS. 1A and 1B which is called extended. In the embodiment of FIG. 1, the change from the second to the first position has been obtained by pivoting the part 4 of the keyboard through 180 degrees around the hinge 7. It will be noted that at the start of this manoeuvre the keys 4A and 5A of the extended keyboard, which were only accessible, have all become inaccessible and replaced, as regards the keyboard, by the keys 4C which, in the embodiment of FIGS. 1A and 1B, are inaccessible as they are situated on the main side of the mobile part 4 opposite the main side that supports the keys 4A. It will also be noted that the manoeuvre indicated above has not changed the size of the device. The device of FIGS. 1C and 1D may be either the same device as that of FIGS. 1A and 1B, in essence, advantageously a mobile telephone, or another device, advantageously a personal organizer. If it is a question of a mobile telephone in the two configurations, no electric switching is necessary when a change is made from the configuration 1A to the configuration 1C. In that case, the device that has a reduced keyboard and a notably enlarged display because there is no masking of the keyboard by the movable part, may advantageously be used for scrolling the menu for the purpose of data or modifications, a large screen being useful for this purpose and a keyboard that no longer needs keys for the digits can be reduced (an incoming call always remains possible during this use).

The device of FIGS. 1C and 1D may advantageously also be a personal organizer, the change of functionalities being obtained either automatically by any known means during the handling discussed above for the movable part 4, or manually by means of a key 4C (not shown) similar to the key 8 of FIG. 1A. The latter option is interesting in that it permits an operation either as a mobile telephone as described above, or as an organizer in its configuration with a reduced keyboard. If the device is a personal organizer, in the configuration 1C, the display screen 6 may have sensitive areas enabling the user to enter data by touching the screen, and the keys 4C may comprise a pointer element 11 of the trackball type.

For realizing the necessary electrical connection between the movable part 4 of the keyboard and a printed circuit (not shown) inside the housing of the device 10, connection means are provided which, in the embodiment of FIG. 1, are formed by a flat cable of conducting wires 12, which crosses the main side of the device through a slot 13 made at the level of the hinge (see FIG. 1).

FIG. 2 represents in C and D the movable part of the keyboard 4 disengaged from the rest of the device referenced 20, which enables to better appreciate the the composition of the hinge 7 that connects these two elements (the keys 4A, 5A and 4C have not been represented so as not to overload the drawings). FIG. 2 represents neither the microphone nor the earphone and the antenna 1 is represented in a broken line, all this to indicate that the device 20 could not be a mobile telephone or even a radio communication device, but another type of electronic device such as a pocket calculator, for example, in its configuration according to which the keyboard is in its second, extended, position.

The embodiment of FIG. 2 comprises stop means to stop the movable part 4 of the keyboard in the first or second position. These means comprise a magnet 21 fixed to the part 4 of the keyboard, and a magnetic part 22, 23 respectively, correspondingly fixed to the main side of the device 20. It is also possible to replace the magnetic parts 22 and 23 by magnets and the magnet 21 by a corresponding magnetic part.

As indicated above, establishing an electrical contact inside the device may be necessary when the change from one to the other position of part 4 of the keyboard is accompanied with a modification of the functionalities of the device. Establishing this contact could be realized (in a manner not shown) at the level of the hinge 7 by using the 180-degree movement effected during the displacement of part 4. Advantageously, this contact can also be established at the level of the stop means 21, 22, 23 of the movable part 4, as described below with reference to FIG. 3.

FIG. 3 shows a portion of part 4 of the keyboard that includes a magnet 21. Opposite occurs the magnetic part 22 or 23 of the device 20, which is formed by two stubs 25 and 26, each connected to an electrical conductor 27, 28 inside the device. When the magnet 21 arrives at the contact of the stubs 25 and 26, it ensures the desired mechanical locking and at the same time realizes the electrical connection between the conductors 27 and 28, which, inside the device 20, leads to a polarization or the flowing of an electric current which in its turn causes the change of the type of operation of the device.

Figure 4:
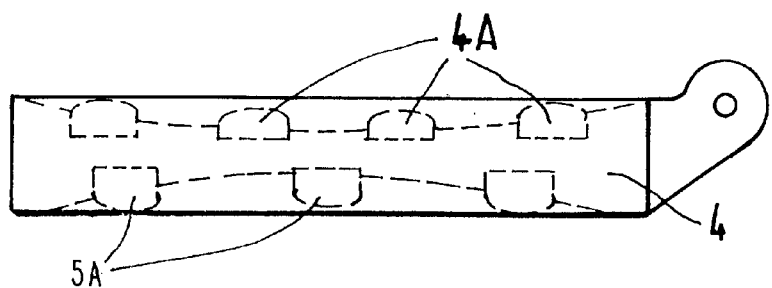
FIG. 4 shows in a side view a preferred embodiment of the second movable part of the keyboard.

When the movable part 4 of the keyboard is put in place in its first or second position, one should see to it that the keys 4A or 4C do not come into contact with parts of the main side of the device 10 or 20, that is to say, with the screen 6 or with the keys 5A. For this purpose, an advantageous embodiment of the invention comprises giving each face of the part 4 a slightly reflex curve as represented in FIG. 4, and the same measure may be taken as regards part 5 of the fixed keyboard or display screen 6. Thus, although projecting, the keys remain slightly retracted relative to the area of the parts of the keyboard supporting them and the contacts of the main side with the part 4 are positioned at the level of these areas, which provides both a good support for the useful keys and a good protection for the hidden, inaccessible keys.

What is claimed is:

1. An electronic device comprising:
    a display; and
    a keyboard having a fixed part and a movable part;
    wherein said movable part moves between a first position and a second position; a viewable part of said display changing while a width of said electronic device remaining unchanged when said movable part is in said first position and said second position, said width being shorter than a length of said electronic device.

2. The electronic device of claim 1, wherein said movable part has a first face with a first set of keys and a second face with a second set of keys, said second set of keys covering keys of said fixed part in said second position, and said first set of keys covering a portion of said display in said first position.

3. The electronic device of claim 1, wherein said movable part has a first face with a first set of keys and a second face with a second set of keys, said first set of keys covering a portion of said display and exposing keys of said fixed part in said first position.

4. The electronic device of claim 1, wherein said movable part has a first face with a first set of keys and a second face with a second set of keys, said second set of keys covering keys of said fixed part in said second position without covering a portion of said display in said second position.

5. The electronic device of claim 1, wherein a first face of said movable part includes a first set of keys which are accessible by a user in said first position and not accessible in said second position, and wherein a second face of said movable part includes a second set of keys which are accessible in said second position and not accessible in said first position.

6. The electronic device of claim 1, wherein a first set of keys of said fixed part and said movable part are accessible by a user in said first position and not accessible in said second position, and wherein a second set of keys of said movable part is accessible in said second position and not accessible in said first position.

7. The electronic device of claim 1, wherein said movable part is connected to said fixed part by a hinge.

8. The electronic device of claim 1, wherein said movable part and said fixed part are connected by a cable.

9. The electronic device of claim 1, wherein said movable part is connected to said fixed part by hinges and wherein said movable part and said fixed part are connected by a cable passing though a slot located between said hinges.

10. The electronic device of claim 1, further comprising holding means for holding said movable part in said first position and said second position.

11. The electronic device of claim 10, wherein said holding means includes a magnet on said movable part and magnetic pieces on said fixed part and a frame of said display.

12. The electronic device of claim 1, wherein said electronic device includes at least one of a mobile telephone, a calculator and an organizer.

13. The electronic device of claim 1, wherein said electronic device is a mobile telephone when said movable part is in said first position and an organizer when said movable part is in said second position.

14. The electronic device of claim 1, wherein said movable part partially covers said display in said first position.

15. The electronic device of claim 1, wherein said display is fully exposed when said movable part is in said second position, said display being a touch display which provides data access by touching said display.

16. The electronic device of claim 1, wherein said movable part has a contour that prevents keys of said movable part from touching keys of said fixed part in said second position.

17. The electronic device of claim 1, wherein said movable part has a contour that prevents keys of said movable part from touching said display in said first position.

18. An electronic device comprising:
a display; and
a keyboard having a fixed part and a movable part;
wherein said movable part moves between a first position and a second position; a width of said electronic device remaining unchanged when said movable part is in said first position and said second position, said width being shorter than a length of said electronic device, wherein said electronic device includes at least two functions which are automatically switched in response to detection of a location of said movable part.

19. An electronic device comprising:
a display; and
a keyboard having a fixed part and a movable part;
wherein said movable part moves between a first position and a second position; a width of said electronic device remaining unchanged when said movable part is in said first position and said second position, said width being shorter than a length of said electronic device, wherein said electronic device includes at least two functions which are switched by a key of said keyboard.

20. An electronic device comprising:
a display; and
a keyboard having a fixed part and a movable part;
wherein said movable part moves between a first position and a second position; a width and a length of said electronic device remaining unchanged when said movable part is in said first position and said second position.

* * * * *